(12) United States Patent
Rountree

(10) Patent No.: US 6,561,745 B2
(45) Date of Patent: May 13, 2003

(54) HAND TRUCK FOR TRANSPORTING FLOOR SANDER

(76) Inventor: Timothy R. Rountree, 1071 Lick Creek La., Boston, KY (US) 40107

( * ) Notice: Subject to any disclaimer, the term of this patent is extended or adjusted under 35 U.S.C. 154(b) by 0 days.

(21) Appl. No.: 09/912,928

(22) Filed: Jul. 25, 2001

(65) Prior Publication Data

US 2003/0021663 A1 Jan. 30, 2003

(51) Int. Cl.[7] ............................ B62B 1/04; B62B 1/06
(52) U.S. Cl. .................... 414/490; 414/444; 414/448; 414/449; 280/47.27
(58) Field of Search .................. 414/448, 449, 414/490, 444; 280/47.27

(56) References Cited

U.S. PATENT DOCUMENTS

| | | |
|---|---|---|
| 1,142,088 A | 4/1915 | Greene |
| 1,640,933 A | 8/1927 | Gries |
| 1,795,826 A | 3/1931 | Bowen |
| 1,807,128 A | 5/1931 | Munoz et al. |
| 1,862,546 A | 6/1932 | Pehrsson |
| 1,934,289 A | 11/1933 | White |
| 2,393,692 A | 1/1946 | Katzman |
| 2,432,368 A | 12/1947 | Avril |
| 2,543,254 A | 2/1951 | Osborn |
| 2,778,515 A  * | 1/1957 | Hason ........................ 414/448 |
| 3,255,905 A | 6/1966 | Cochran |
| 3,422,579 A  * | 1/1969 | Rogge et al. ................ 451/352 |
| 3,777,923 A | 12/1973 | Padgett |
| 3,907,322 A | 9/1975 | Kiryu |
| 4,150,456 A | 4/1979 | Alvarez et al. |
| 4,367,880 A  * | 1/1983 | Harding ............... 280/47.13 R |
| 5,390,943 A  * | 2/1995 | Hedrick .................... 280/47.24 |
| 5,947,491 A  * | 9/1999 | Meier ......................... 280/47.2 |
| 5,951,037 A  * | 9/1999 | Hsieh et al. ................. 280/655 |
| 6,131,927 A | 10/2000 | Krawczyk |
| 6,155,362 A  * | 12/2000 | Owens ....................... 180/9.22 |

FOREIGN PATENT DOCUMENTS

| | | | |
|---|---|---|---|
| CH | 664146 | * 2/1988 | ................. 414/490 |

* cited by examiner

*Primary Examiner*—Steven A. Bratlie
(74) *Attorney, Agent, or Firm*—Carrithers Law Office; David W. Carrithers

(57) ABSTRACT

A wheeled dolly for transporting and/or storing a floor sander to maintain the rubber tired wheels of the sander in a no load state and thereby preventing flat spots from forming in the tires resulting in variations in the depth of sanding process. Also disclosed is a dolly with a hand operable brake for selectively restraining rotation of at least one of the dolly wheels.

26 Claims, 4 Drawing Sheets

HAND TRUCK FOR TRANSPORTING FLOOR SANDER

BACKGROUND OF THE INVENTION

1. Technical Field

This invention relates generally to floor sanding and more particularly to a two wheel hand truck for moving the floor sander from one location to another, from a vehicle to work station via ramps, and supporting the floor sander with the wheels thereof in a no load state when the sander is not in use.

2. Background Information

Floor sanders conventionally have a sanding drum on a frame that is carried by a front pair of wheels and a single rear caster type wheel. The wheels have a rubber tire (relatively hard) and because of the weight of these machines the tires develop a flat spot when they sit idle for any length of time. Flat spots on the tires are most undesirable as they cause the machine to go up and down while the machine traverses the floor area during sanding. This leaves an undulating surface when all the flat spots are in sync or gouges when they are not. The resultant surface in either event is most unsatisfactory and unacceptable for more reasons than just the undesirable aesthetic effect. For one thing polishing an undulating surface will cause more wear to the surface finish on the crests than in the valleys of the undulating surface. The end result is a premature failure of the surface finish.

A two wheel hand truck, commonly referred to as a dolly, has a vertical section with two wheels on the lower end thereof and a forwardly projecting spaced pair of arms, or a plate, for supporting the load. The upper end of the frame is a handle and the center of gravity of the unit is such that the unit stands upright on the two wheels when the unit in not in use. In this at rest position the plate is disposed in a slight decline and the leading end thereof engages the ground surface. During use, after the load is located on the arms, or the plate as the case maybe, the wheels serve as a pivot point while the user tilts the handle to a load transport position where the center of gravity of the dolly frame and the load passes through or is located near the axle on which the wheels are mounted. With heavy loads, such as a floor sander, the wheels of the dolly tend to roll while attempting to tilt the dolly making it necessary to block at least one of the wheels with some object and normally the user puts one foot on one wheel to prevent the dolly from moving.

When a heavy load is carried by a dolly it is relatively easy to move and control the same while traversing a level surface but this is not so on a sloping surface, for example on a steep driveway or ramp for loading and unloading the sander in a vehicle.

A floor sanding machine with a transport carriage is disclosed in United States Utility Patent 1,640,933 granted Aug. 30, 1927 to L. M. Gries. It is an integrated unit that does not teach discuss the problems regarding preventing rubber tired wheels on a sander from developing flat spots when not in use.

SUMMARY OF INVENTION

The present invention is for a hand truck for transporting a floor sander. More particularly, the present invention is for a combination of a conventional floor sander that is rollingly supported on rubber tired wheels during use of the machine to sand a floor and a wheeled hand truck. The hand truck or dolly includes a pair of spaced apart arms projecting forwardly therefrom adjacent a lower end thereof. Also included are means removably mounted on the arms and supporting the sander on the dolly forwardly projecting arms with the wheels of the sander in a no load state and thereby preventing the tires from developing flat spots during idle time of the machine while in storage and transport from one work site to another. Means for detachably anchoring the sander to the dolly are also included.

The dolly may also include means removably mounted on the arms such as a pair of cross members slidably mounted on the arms. A means of interconnecting the pair of arms to maintain the same in a fixed spaced apart relation such as a flat strap may also be used with the dolly and sander arrangement. The cross members may also have a slot adjacent each of opposite ends thereof slidably receiving therein respective ones of the forwardly projecting arms.

Moreover, the dolly has an upwardly projecting frame portion with handle means on the upper end thereof, a forwardly projecting load carrying member on the lower end of the frame and a pair of wheels on opposite edges of the frame adjacent the lower end thereof the improvement comprising a hand operated brake operable on at least one of the wheels to selectively restrain rotation of the same, the brake having a hand operable lever mounted on the frame adjacent the handle means. The handle means may define a laterally spaced pair of loops on the upper end of the frame and projecting forwardly therefrom. The load carrying member on the lower end of the frame may define a pair of laterally space apart arms, and each of the arms are may be positioned so that they are right angular in cross-section. The dolly may also include a pair of cross members slidably mounted on and extending from one of the arms to the other for supporting an object thereon.

A principal object of the present invention is to provide a floor sander with a dolly that can be used to support the sander and transport the same from one location to another with the sander wheels in a no load state thereby eliminating the development of flat spots on the wheels that otherwise occurs during down time between sanding jobs.

A further object of the present invention is to provide a dolly, for transporting objects, with a hand operated wheel brake to facilitate tilting the dolly from an object pick-up position to an object transport position.

A still further object of the present invention is to provide the forgoing sander and dolly combination and in which the dolly is a stair type and including a hand operated wheel brake.

In keeping with the forgoing there is provided in accordance with one aspect of the present invention the combination of a conventional floor sander that is rollingly supported on rubber tired wheels during use of the machine to sand a floor and a hand truck on which the floor sander is detachably supported and carried such that the wheels are in a no load state during idle time of the machine while in storage and transport from one work site to another.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENTS

Figure 1:
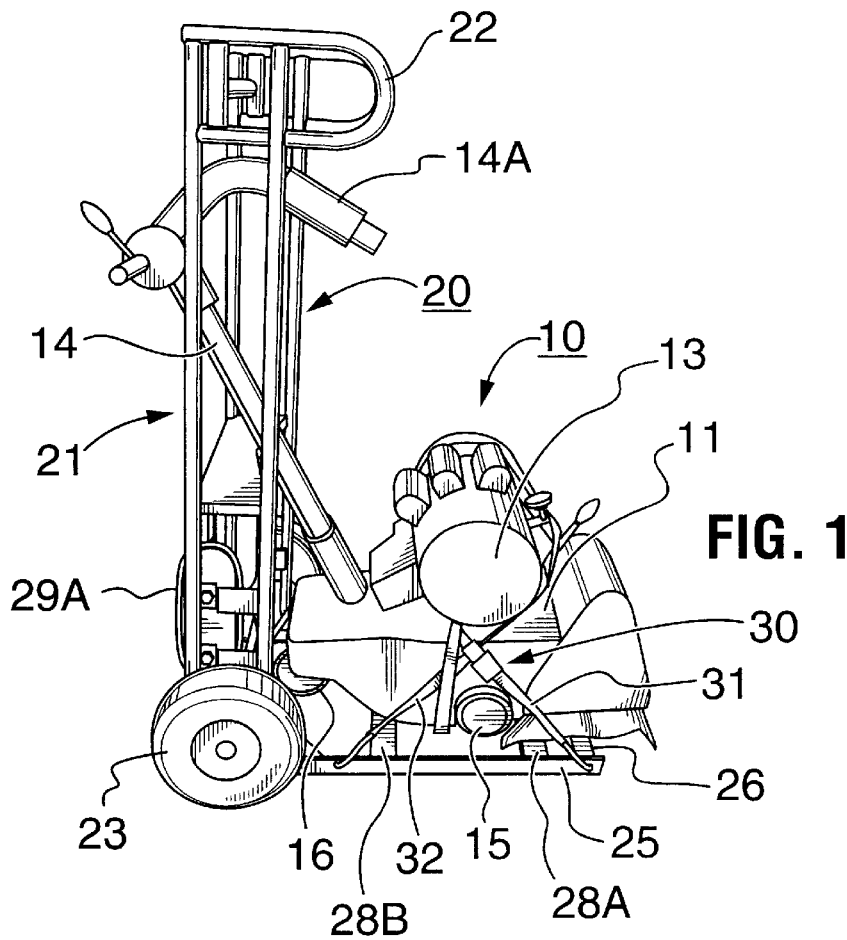
FIG. 1 is a side elevational view of the combined floor sander and dolly therefor provided in accordance with the present invention.

Illustrated in FIGS. 1 to 4 is a drum type conventional floor sander 10 having forward positioned motor and drum and a plurality of small rubber wheels used to support the floor sanding during the sanding process. The floor sander has a rigid robust frame 11 on which there is mounted a sanding drum 12 and a drum drive motor 13. There is also a handle 14 and a saw dust exhaust system 14A on the frame. The embodiment shown is typical and includes a frame 11 supported by a pair of front, laterally spaced apart, rubber tired wheels 15 and a single rear caster type rubber tired wheel 16.

The floor sander is removably carried by a two wheel cart 20 hereinafter referred to as a dolly. The sanding machine is anchored to the dolly by suitable anchor means 30, by for example, a criss-crossed pair of straps shown in FIGS. 1 & 3 and designated 31 and 32, respectively.

The dolly 20 includes an upright frame portion 21 in the form of a weldment of tubular members having at the upper end thereof a pair of forwardly projecting loop handles 22. The handles of the preferred embodiment are typically shorter in length than that of a conventional dolly to facility loading and transporting the dolly and floor sandy in a van and thus, it must be of a height to allow it to stand in an upright position. Moreover, the loops afford a means of supporting and pushing or pulling the dolly and floor sander up a ramp and into the van door where the accessibility is limited and holding the dolly securely is difficult with a conventional handle having a curved distal holding end. The loops allow the dolly to be lowered to almost ground level while the user remains upright and balanced.

The dolly is supported at the lower end on a spaced apart pair of rubber tired wheels 23. The wheels are journal led on a transverse axle 24 that is secured to the lower end of the frame. A spaced apart pair of load carrying arms 25 are attached to and project forwardly from the lower end of the frame portion 21. With the frame portion 21 upright in an at rest position the arms 25 are slightly downwardly inclined but essentially in a horizontal plane. In the embodiment illustrated in FIGS. 1 to 6, the pair of arms 25 are interconnected adjacent their free outer end by a relatively thin metal strap 26 to ensure the arms remain in a fixed spaced apart position.

The load carrying arms are right angle in cross-section and have a lower flange 27 and a vertical upwardly directed flange 27A. The flanges 27 are directed inwardly toward one another and support opposite ends of each of a pair of spaced apart cross-members 28A and 28B. The lower face of the frame 11 of the floor sander rests on the cross members 28A & 28B at a suitable position such that the wheels 15 and 16, respectively, of the sander are out of contact with the surface supporting the dolly. The sander wheels thus are in a no-load state thereby eliminating flat spots that otherwise develop when the weight of the sander is carried by its rubber tired wheels during idle time of the sander between sanding jobs. The upwardly directed flanges 27A are outboard of and adjacent the ends of the cross members 28A and 28B thereby holding the same captive between the arms 25.

Figure 5:
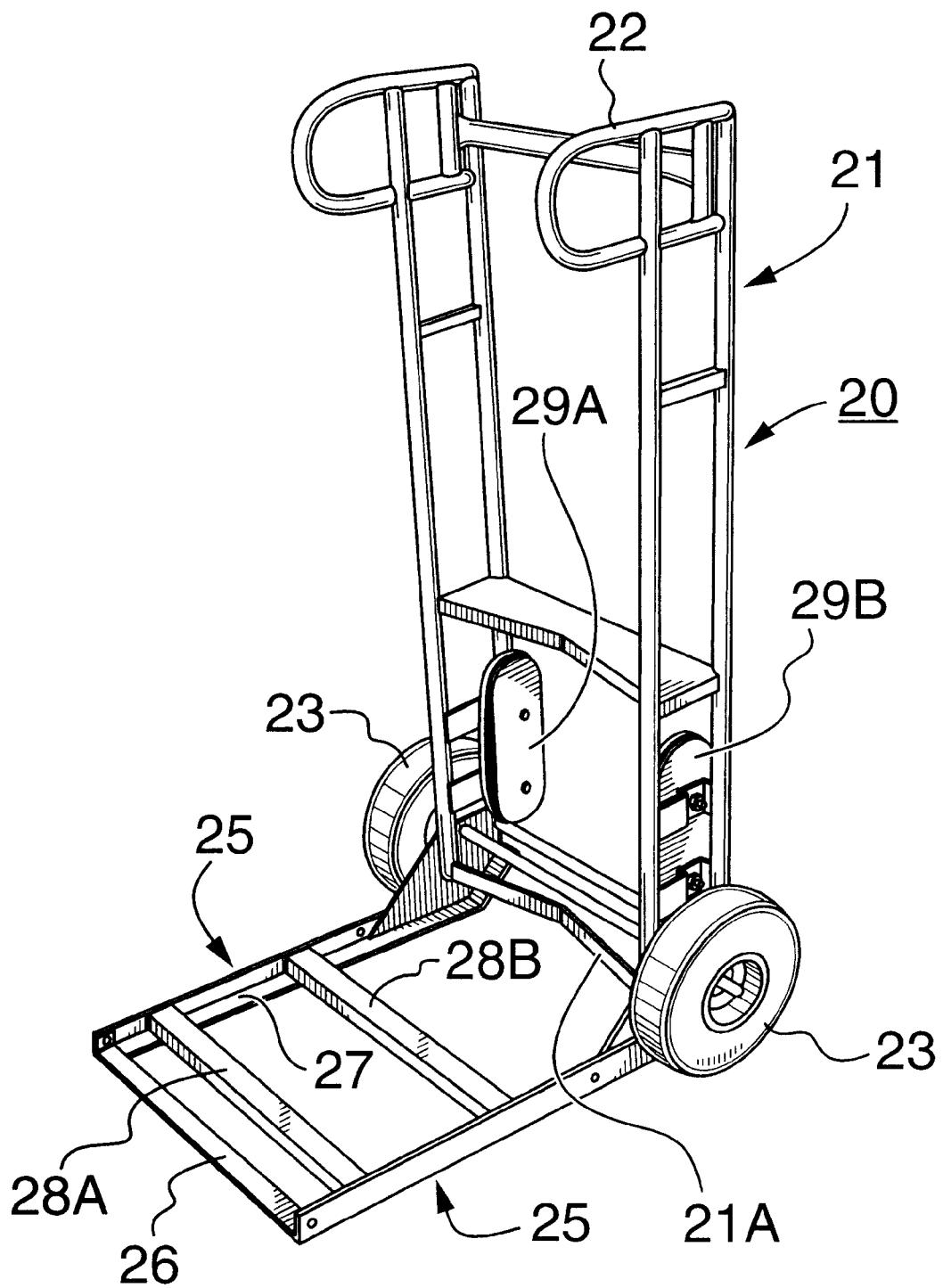
FIG. 5 is an oblique view of only the dolly.
Figure 6:
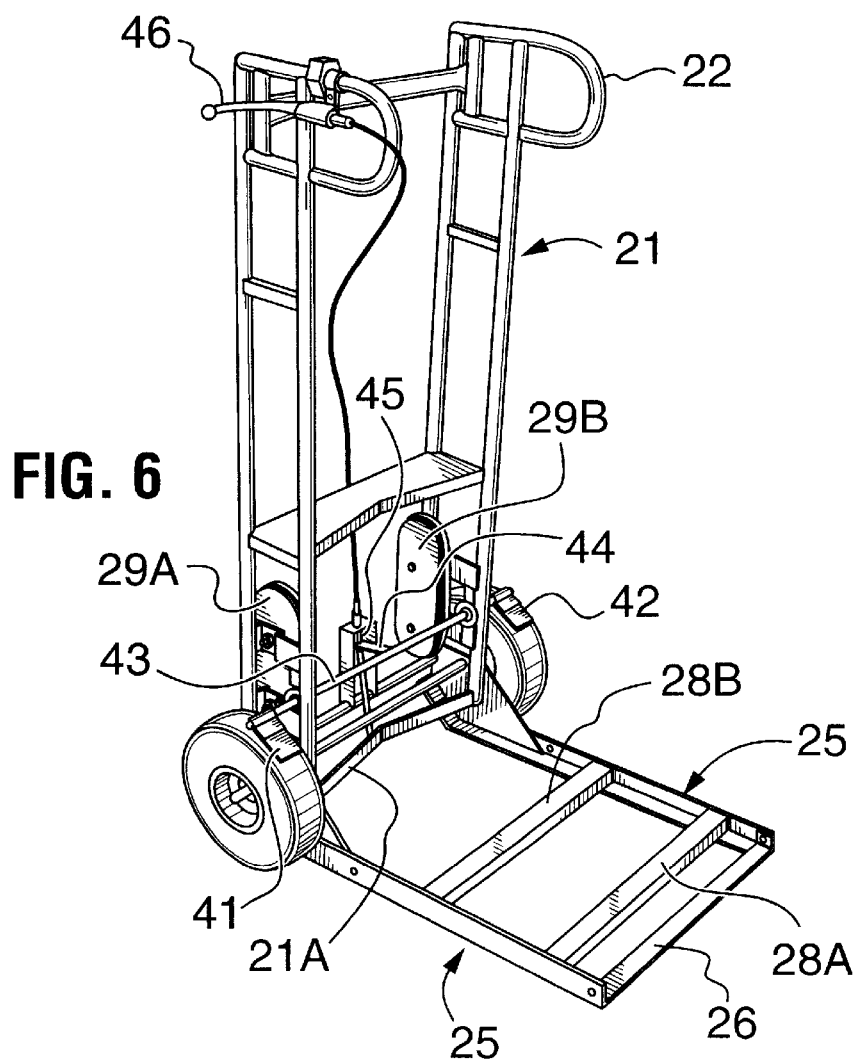
FIG. 6 is an oblique view illustrating a hand brake on the dolly.

As shown best in FIGS. 5 and 6, an alternate embodiment includes as an option for traversing steps or stairways, at least one laterally spaced apart endless tracks 29A and 29B that project from the rear face of the upright frame portion 21 of the dolly at a position adjacent the lower end thereof. A plurality of tracks or a single wide track may be utilized with the present invention.

The width of the sander 10 is less than the spacing between the pair of forwardly projecting dolly arms 25 and with the arms interconnected adjacent their free outer end by a relatively thin strip of material the sander is easily pulled by its handle over the strip 26 and positioned between the arms 25 with the rear caster wheel 16 abutting a shallow V-shaped cross piece 21A on the lower end of the frame 21. One end of the sander is then raised and one of the cross pieces 28A, 28B placed under the sander frame and on the flanges 27 of the pair of arms. The other end of the sander is then lifted and same done to place the other of the cross pieces 28A, 28B under another portion of the frame of the sander. The sander is then anchored to the dolly by the straps 31 and 32 where after the combination is readily wheeled from one location to another including up and down flights of stairs.

Figure 2:
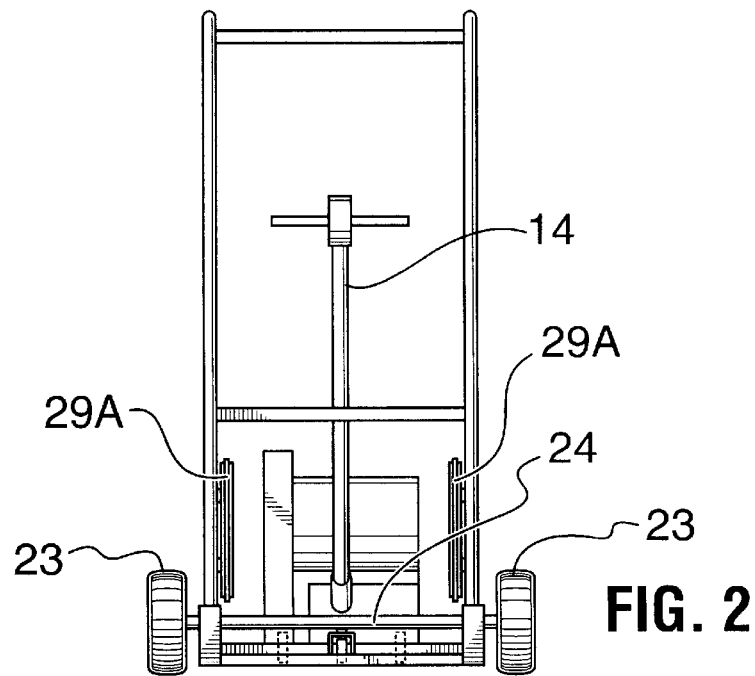
FIG. 2 is a rear elevational view of the apparatus shown in FIG. 1.
Figure 3:
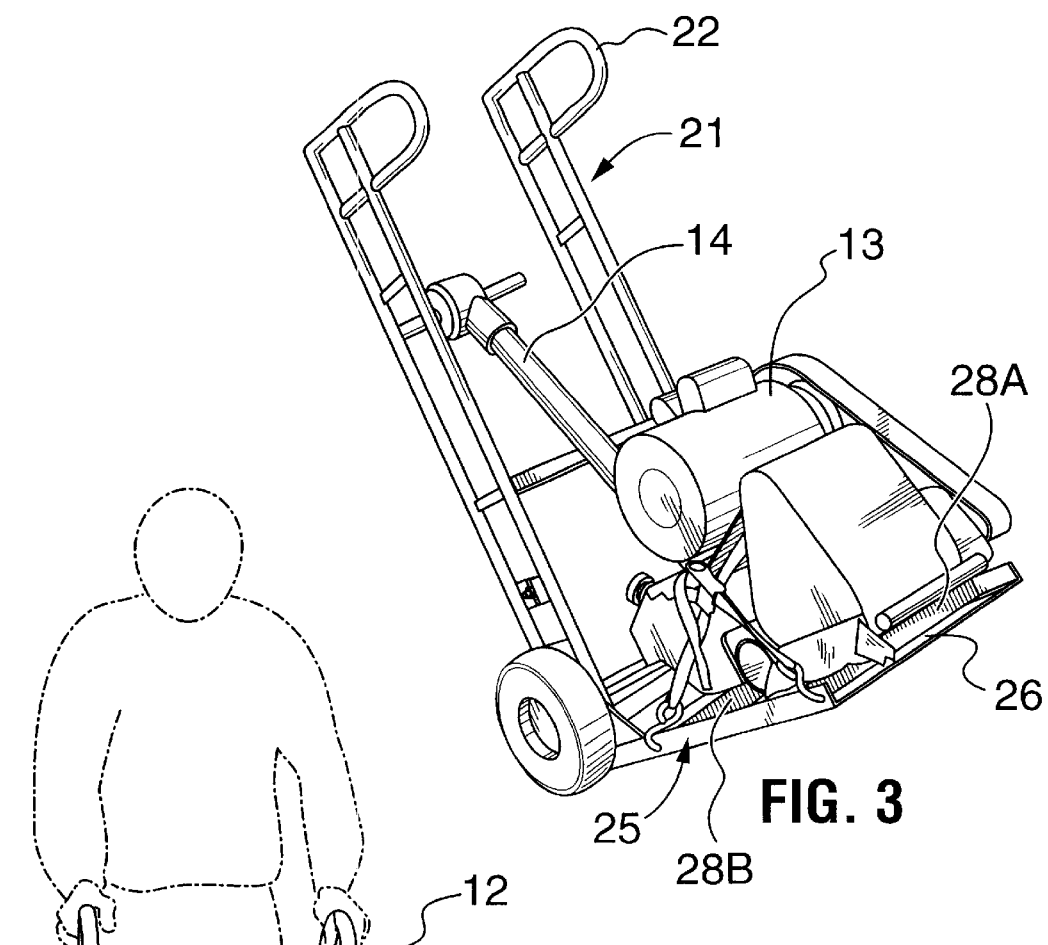
FIG. 3 is an oblique front view showing the dolly in a tilted position for transporting the sander from one location to another.
Figure 4:
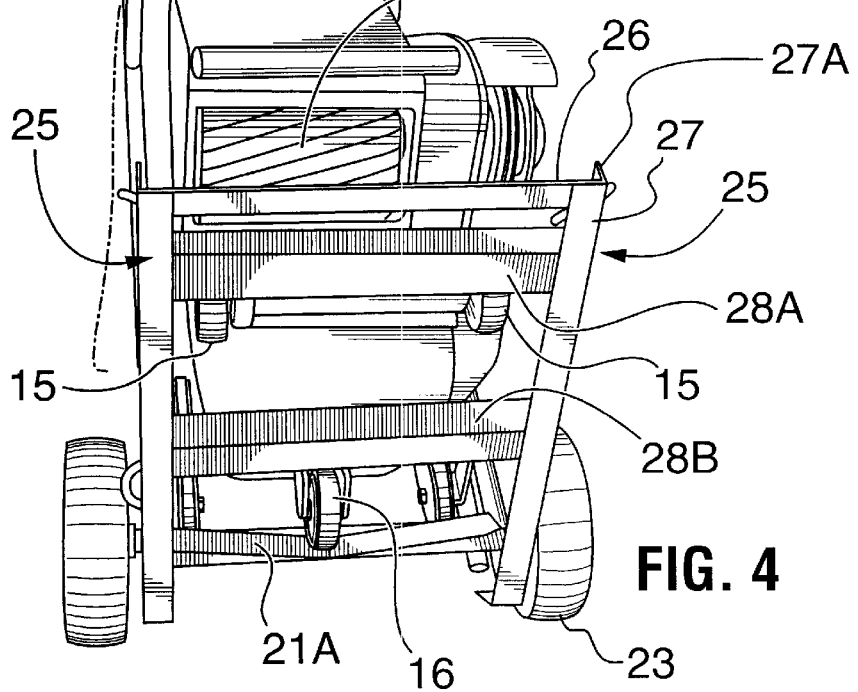
FIG. 4 is an oblique side view showing the dolly in a tilted position for transporting the sander from one location to another.

FIGS. 3 and 4 show the dolly in a tilted transport position while FIGS. 1 and 2 show the combination in an at rest storage and loading position. As previously mentioned tilting the frame to the transport position can often be difficult because of the tendency of the dolly to roll on its wheels. Also the dolly with a heavy load thereon can be difficult to control when being wheeled down a steep incline as maybe the case with some driveways.

In accordance with another aspect of the present invention the dolly is provided with at least one and preferably a pair of hand operated wheel brakes. In this regard attention is directed to FIG. 6, illustrating a pair of wheel engaging plates 41 and 42 attached to a shaft 43 that is mounted on the upright frame 21. A lever arm 44 is attached to and projects from the shaft 43 and the free end thereof is connected to a sheathed flexible tension cable 45. The other end of the tension cable is connect to a hand operated lever 46 that is pivotally connected to the frame 21 at a location readily grasped while using the dolly, for example on one of the handles 22.

Figure 7:
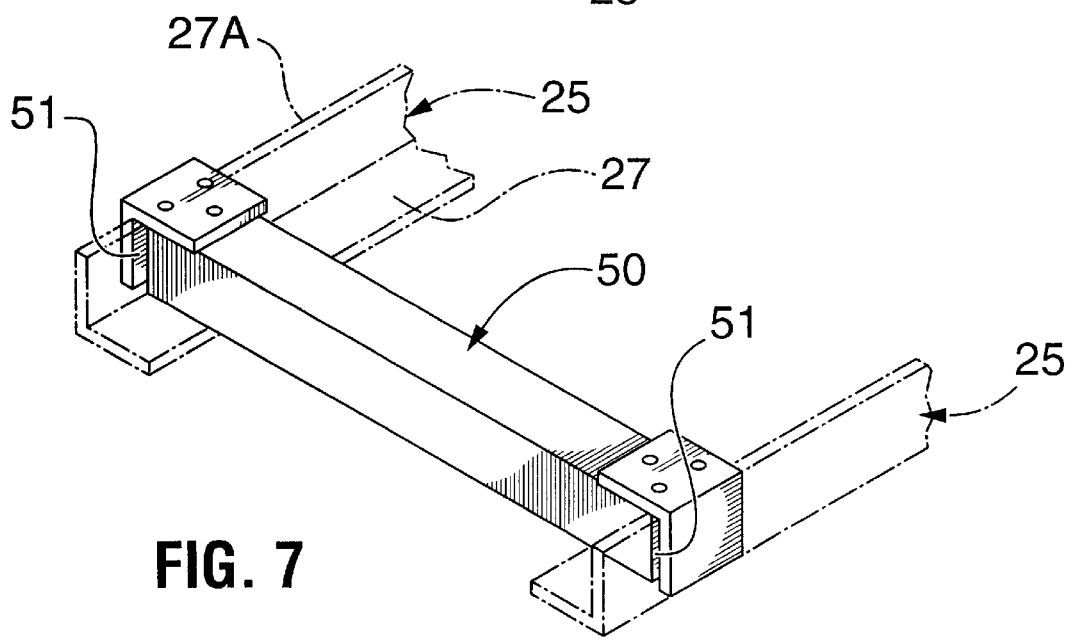
FIG. 7 is a partial oblique view illustrating a modified cross piece that supports the sander on the forks of the dolly.

Referring to FIG. 7, there is illustrated a cross piece 50 that is slidable longitudinally along the arms 25 and a pair of the same replaces the previously described cross pieces 28A and 28b as well as the flat stripe 26 that interconnects the outer ends of the arms. The cross piece 50 has a notch 51 in each of opposite ends thereof that receives therein the flanges 27A to thereby maintain, in an obvious manner, a fixed spacing between the arms 25. If desired means maybe provided to restrain the cross pieces 28A, 28B and/or 50 from sliding along the arms 25 once they are in place under the frame of the sander. For example there may be a set screw that can finger turned to project into the notch 51 and abut against the flange 27A.

The brake can be designed to work on one or both of the dolly's wheels and also if desired a hand operated brake can be provided to selectively restrain movement of one or the other or both of the endless belts 29A and 29B.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A hand truck for transporting a conventional floor sander that is rollingly supported on a plurality of rubber tired wheels extending below a frame of said sander during use of the machine to sand a floor, comprising:

an upwardly projecting frame with handle means on the upper end thereof, a forwardly projecting load carrying member defining a pair of laterally spaced apart arms projecting forwardly therefrom on the lower end of said upwardly projecting frame and a pair of wheels on opposite edges of said lower end of said upwardly projecting frame adjacent the lower end thereof;

said handle means comprising members extending forward from said upwardly projecting frame;

means removably mounted on said arms and supporting said sander on said hand truck forwardly projecting arms with said plurality of rubber tired wheels of said sander in a no load state and thereby preventing the rubber tired wheels from developing flat spots during idle time of the machine while in storage and transport from one work site to another;

said means removably mounted on said arms for supporting said sander comprising at least one cross member defining a sliding frame support means slidably mounting on and extending from one of said arms to the other; and means detachably anchoring said sander to said hand truck.

2. The hand truck of claim 1, wherein said sliding frame support means comprises a pair of cross members slidably mounted on said arms.

3. The hand truck of claim 1 including means interconnecting said pair of arms to maintain the same in a fixed spaced apart relation.

4. The hand truck of claim 3, wherein said means interconnecting said arms comprises a strap.

5. The hand truck of claim 2, wherein said cross members have a slot adjacent each of opposite ends thereof slidably receiving therein respective ones of the forwardly projecting arms.

6. The hand truck of claim 1, including means for braking at least one of said wheels.

7. The hand truck of claim 1 including means for braking said at least two wheels.

8. The hand truck of claim 1, including at least one laterally spaced apart endless track projecting from a rear face of said upright frame portion of said hand truck at a position adjacent the lower end thereof.

9. The hand truck of claim 1, wherein said handle means comprises a laterally spaced pair of loops on an upper end of said upwardly projecting frame.

10. The hand truck as defined in claim 1, wherein each of said arms are right angular in cross-section.

11. The hand truck as defined in claim 1 including a pair of cross members slidably mounted on and extending from one of said arms to the other for supporting an object thereon.

12. The hand truck of claim 1, wherein the space between said pair of arms is greater than the width of said floor sander.

13. The hand truck of claim 6, wherein said means for braking comprises a hand operated brake operable on at least one of said wheels to selectively restrain rotation of the same, said brake having a hand operable lever mounted on said frame adjacent said handle means.

14. The hand truck of claim 8, including a hand operated brake cooperatively engaging said endless track for selectively restraining movement thereof.

15. A hand truck and floor sander assembly, comprising:

a floor sander that is rollingly supported on a plurality of rubber tired wheels during use;

an upwardly projecting frame portion with forwardly projecting handle means on the upper end thereof, a forwardly projecting load carrying member defining a pair of spaced apart arms projecting forwardly therefrom on the lower end of said frame portion and a pair of wheels on opposite edges of said lower end of said frame portion adjacent the lower end thereof;

means removably mounted on said arms and supporting said sander on said hand truck forwardly projecting arms with said plurality of rubber tired wheels of said sander in a no load sate and thereby preventing the rubber tires wheels from developing flat spots during idle time of the machine while in storage and transport from one work site to another; and means detachably anchoring said sander to said hand truck.

16. The hand truck and floor sander assembly of claim 15, wherein said means removably mounted on said arms define a sliding frame support means comprising a pair of cross members slidably mounted on said arms.

17. The hand truck and floor sander assembly of claim 16, wherein said cross members have a slot adjacent each of opposite ends thereof slidably receiving therein respective ones of the forwardly projecting arms.

18. The hand truck and floor sander assembly of claim 15, including means interconnecting said pair of arms to maintain the same in a fixed spaced apart relation.

19. The hand truck and floor sander assembly of claim 18, wherein said means interconnecting said arms comprises a strap.

20. The hand truck and floor sander assembly of claim 15, including means for braking at least one of said wheels.

21. The hand truck and floor sander assembly of claim 20, wherein said means for braking comprises a hand operated brake operable on at least one of said wheels to selectively restrain rotation of the same, said brake having a hand operable lever mounted on said frame adjacent said handle means.

22. The hand truck and floor sander assembly of claim 15, including means for braking said at least two wheels.

23. The hand truck and floor sander assembly of claim 15, including at least one laterally spaced apart endless track projecting from a rear face of said upright frame portion at a position adjacent the lower end thereof.

24. The hand truck and floor sander assembly of claim 15, wherein said handle means comprises a laterally spaced pair of loops on an upper end of said upwardly projecting frame portion.

25. The hand truck and floor sander assembly as defined in claim 15, wherein each of said arms are right angular in cross-section.

26. The hand truck and floor sander assembly as defined in claim 15, wherein the space between said pair of arms is greater than the width of said floor sander.

* * * * *